United States Patent Office

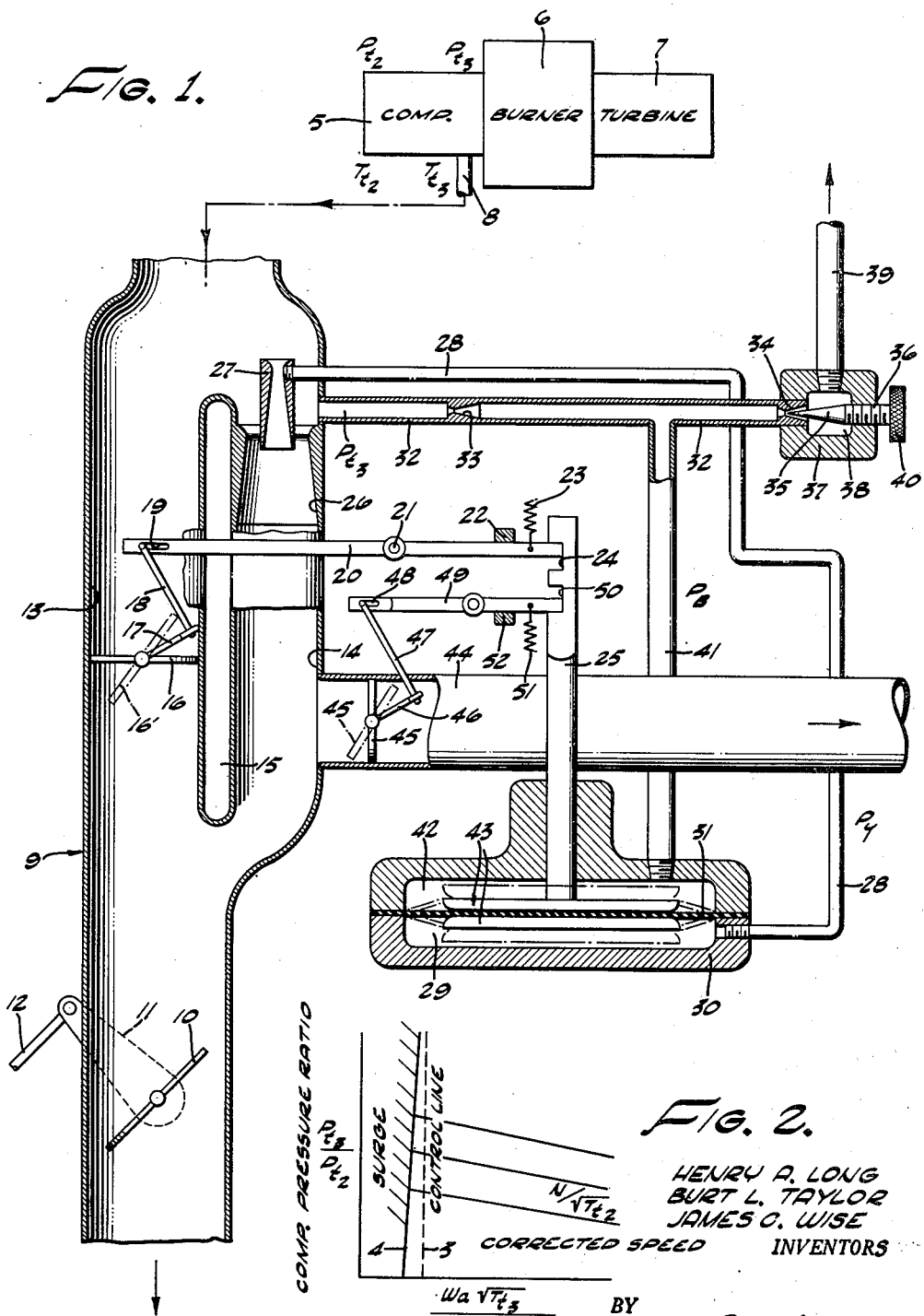

2,813,672
Patented Nov. 19, 1957

2,813,672

SURGE LIMITER

Henry A. Long, Van Nuys, Burt L. Taylor, Fullerton, and James C. Wise, Woodland Hills, Calif., assignors to Marquardt Aircraft Company, Van Nuys, Calif., a corporation of California Application September 3, 1953, Serial No. 378,275

12 Claims. (Cl. 230—114)

This invention relates to a device for preventing compressor surge in a gas turbine engine and more particularly, to a device for bleeding off a regulated amount of air from the compressor so that compressor surge will not develop.

In connection with compressors designed to supply compressed air rather than thrust or power, it has been the practice to prevent compressor surge by bleeding air from the discharge side of the compressor. However, the present invention relates to compressors for gas turbines wherein the turbine and compressor have been matched so as to require a certain minimum amount of bleed air in order to avoid surge. It is provided that air can be bled from the discharge of the compressor for various useful purposes, but if air is not bled for useful purposes, a minimum amount will automatically be bled off and wasted. The invention contemplates a useful air bleed passage connected to the discharge side of the compressor, which passage includes means for determining whether or not the minimum amount of air is being bled off for useful purposes to prevent surge. In the event that insufficient useful bleed air is being used, an overboard passage is connected to the discharge side to maintain the minimum bleed to the overboard passage. A differential pressure unit is made responsive to the bleed air flow in order to control the overboard passage and provide for minimum continuous flow.

It is, therefore, an object of the present invention to provide a surge limiter for preventing surge of the compressor for a gas turbine engine.

Another object of the invention is the provision of a control device to regulate the amount of bleed air in order to observe the surge line of the compressor under all conditions of engine operation.

A still further object of the invention is to provide a compressor bleed pasage for obtaining useful air from the discharge side of the compressor and to provide means for controlling the air flow in the bleed at all times to maintain the minimum flow necessary to prevent compressor surge.

These, and other objects of the invention not specifically set forth above, will become readily apparent from the accompanying description and drawings, in which:

Figure 1 is a diagrammatic view of the surge limiter of the present invention, showing the useful bleed air passage connected to the discharge side of the compressor for a gas turbine engine.

Figure 2 is a plot of the surge line of the compressor with the bleed air flow corrected to the discharge station of the compressor.

The present invention utilizes the fact that the surge line for the compressor is very nearly a straight vertical line when compressor pressure ratio is plotted against bleed air flow, corrected to the discharge station, and corrected speed is plotted as the parameter. The following terms are defined for purpose of the following discussion:

$Pt_3$ = Compressor discharge total pressure
$Pt_2$ = Compressor inlet total pressure
$Wa$ = Air flow bled from compressor
$Tt_2$ = Compressor inlet temperature
$Tt_3$ = Compressor discharge temperature
$N$ = Engine rotative speed In the usual graph of compressor surge line, the compressor pressure ratio $(Pt_3/Pt_2)$ is plotted against corrected bleed airflow $(Wa\sqrt{Tt_2}/Pt_2)$ as the abscissa with corrected speed $(N/\sqrt{Tt_2})$ as the parameter and the surge line runs diagonally across the plot. However, the surge characteristics can be replotted with a new abscissa, namely, bleed airflow corrected to the discharge station $$(Wa\sqrt{Tt_3}/Pt_3)$$

and it is found that the surge line is nearly a vertical line and that the value of corrected bleed airflow at which surge results is practically constant. Such a plot is illustrated in Figure 2 and the vertical control line 3 is positioned to the right of the surge line 4 and as close to the surge line as possible without intersecting the surge line within the range of operating conditions. The control system of the present invention is therefore designed to maintain the value of $Wa\sqrt{Tt_3}/Pt_3$ the same or greater than the amount corresponding to the control line of Figure 2.

The surge limiter will now be described with reference to Figure 1 wherein the usual elements of a gas turbine engine are shown as compressor 5, burner 6 and turbine 7. A bleed air line 8 connects the discharge side of compressor 5 with bleed air duct 9 and duct 9 has a control valve 10 for regulating the useful air flow through the duct. The valve 10 is pivotally mounted within the duct and connects with links 11 and 12 which can be manually or automatically moved to control the open area of the valve. The enlarged section of duct 9 is divided into passages 13 and 14 by a partition 15 so formed as to make each passage circular in cross-section. The passage 13 contains a pivotally mounted valve 16 which connects with links 17 and 18, and the end of link 18 is secured in opening 19 of lever 20. The lever 20 is mounted by pivot pin 21 and has a stop 22 which limits the upward movement of the end of the lever which is continually biased in the upward direction by spring 23. This same end of the lever 20 projects into a slot 24 in arm 25 so that the lever will be moved by the arm in a manner to be described.

The passage 14 has a nozzle portion 26 and a boost venturi 27 located ahead of this portion. A passage 28 connects with the throat of venturi 27 and leads to chamber 29 formed between casing 30 and one side of diaphragm 31. A second passage 32 connects with passage 14 at a position just ahead of nozzle portion 26 and this passage has a fixed upstream orifice 33 intermediate the ends of the passage and an adjustable downstream orifice 34 located at the end of the passage. The area of orifice 34 is varied by a needle 35 connected to a shaft 36 threaded into an opening in casing 37. The casing 37 is secured to the end of passage 32 and has a cavity 38 connecting the discharge side of the orifice to the exhaust passage 39. The shaft 36 has a knob 40 for adjusting the position of needle 35 in order to vary the area of orifice 34.

A passage 41 connects with passage 32 at a position intermediate the orifices 33 and 34 and leads to a chamber 42 formed on the side of diaphragm 31 opposite from chamber 29. The diaphragm is securely supported by casing 30 and has rigid members 43 serving to rigidly connect the diaphragm to arm 25. An overboard passage 44 connects with passage 14 at a position downstream from nozzle portion 26 and contains a pivoted valve 45 connected to links 46 and 47 for movement thereby. One end of link 47 connects with an opening 48 in one end of a lever 49 and the other end of the lever is positioned in a notch 50 in arm 25. This other end of lever 49 is continually urged downwardly by a spring 51 and a stop 52 limits the downward movement.

In Figure 1, the valves 16 and 45 are both shown closed in their full line position and the valve 10 is shown partially open to supply useful bleed air through duct 9. Under such conditions, the diaphragm 31 is centered and the amount of useful bleed air will be just sufficient to maintain the corrected bleed air flow at the value set by control line 3 of Figure 2. It is obvious that the diaphragm 31 will move arm 25 and valves 16 and 45 until the pressures in chambers 29 and 42 are balanced. When arm 25 is moved downwardly, the notch 24 will move lever 20 and the valve 16 will be opened, while valve 45 will be retained in closed position by spring 51 acting through lever 49 against stop 52. The notch 50 will not apply a downward force on lever 49 because the notch is wider than the end of the lever. If the arm 25 moves upwardly as seen in Figure 1, the notch 50 will move lever 49 and the valve 45 will be opened while the valve 16 will be retained in closed position by spring 23 acting through lever 20 against stop 22. The notch 24 will not apply an upward force on lever 20 because of the width of the notch. Thus, the diaphragm 31 serves to govern the by-pass flow in passage 13 and the overboard flow in passage 44 in order to maintain the minimum amount of bleed airflow necessary to avoid surge of the compressor.

The boost venturi provides a measurement of airflow through passage 14 and the corrected airflow through this passage is a function of Mach number or the ratio of total pressure at the entrance of the boost venturi to static pressure at its throat, $P_{t_3}/P_y$. While this pressure ratio is a measure of flow through the boost venturi, it is also a measure of flow through passage 14 since the boost venturi is located in the throat of nozzle portion 26 to give a representative reading. The static pressure $P_y$ is communicated to chamber 29 by passage 28 while the pressure $P_{t_3}$ is obtained from passage 14 by passage 32. Although passage 32 is shown as ending in a static pressure tap in passage 14, the measured value would be very nearly equal to total pressure because of the low Mach number in the duct. Of course, if the Mach number is so high that the approximation is not valid, then a total pressure probe could be placed in passage 14. In order to hold the value of $P_{t_3}/P_y$ constant at any desired value corresponding to the value of $Wa\sqrt{T_{t_3}}/P_{t_3}$ determined by control line 3, a control pressure $P_B$ is obtained from pressure $P_{t_3}$ by means of a pressure divider composed of orifices 33 and 34 and passage 41. If the fixed upstream orifice 33 and the adjustable downstream orifice are both choked, i. e., have sonic velocity flow at their throats, then $$\frac{P_B}{P_{t_3}} = \frac{\text{area of orifice 33}}{\text{area of orifice 34}} = K$$

This function of the pressure divider is discussed in United States Patent No. 2,645,240 to John A. Drake, dated July 14, 1953. Thus, by varying the area of orifice 34, a pressure $P_B$ can be obtained which is any selected fraction of the pressure $P_{t_3}$.

The diaphragm 31 acts to maintain the pressure $P_B = P_y$ and the following equations result:

$$P_B = P_y = KP_{t_3}$$

$$\frac{P_{t_3}}{P_y} = \frac{1}{K}$$

Also, the airflow through the boost venturi can be expressed as follows:

$$\frac{Wa\sqrt{T_{t_3}}}{P_{t_3}} = \frac{f(P_{t_3})}{P_y} = \text{Const.}$$

Therefore, the control line condition is satisfied since the diaphragm will maintain constant the ratio $P_{t_3}/P_y$ and also, the corrected airflow through the boost venturi. The value of constant K can be set by adjusting the area of orifice 34 to obtain the desired value of $1/K$ so as to match the control line for the compressor.

When more than the minimum required amount of bleed air is being bled through the useful air control valve 10, the overboard valve 45 will be closed and the by-pass valve 16 will be opened to a position where the flow of bleed air through the boost venturi will correspond to the selected ratio of $P_{t_3}/P_y$. Thus, as the valve 10 is opened wider, the valve 16 will likewise open until it reaches its full open position indicated by the dotted position 16'. The opening of valve 16 results since the Mach number through the venturi and the pressure ratio $P_{t_3}/P_y$ will increase as the flow through the boost venturi increases and arm 25 will move lever 20 in response to downward movement of diaphragm 31 resulting from this increase. If the useful air valve is closed, the Mach number through the venturi will decrease and $P_y$ will become greater than $P_B$. The diaphragm 31 will then move upwardly and open the overboard valve 45 in a direction toward fully open position 45' and to a position that causes $P_y$ to equal $P_B$. The control resulting from movement of the diaphragm therefore assures that a constant minimum amount of corrected airflow is bled from the engine compressor to prevent surge of the compressor. It is understood that the passage 13 and by-pass valve 16 can be eliminated with the result that all bleed air will pass through the boost venturi but the by-pass valve and passage are desirable in order to keep pressure losses in the ducting to a minimum.

The surge limiter of the present invention utilizes means for maintaining at least the minimum required flow of bleed air from the discharge of the engine compressor and such means provides for the constant minimum flow through a portion of the bleed passage, which flow will prevent surge regardless of the compressor pressure ratio. While a pressure divider has been described in connection with maintaining the constant minimum flow, it is apparent that other equivalent means can be utilized. Further, it is understood that the present invention provides a controlled bleed air system in which useful bleed air can be obtained from the discharge of the compressor in a controlled manner which prevents surge of the compressor. Various other modifications of the invention are contemplated and may be readily resorted to by those skilled in the art without departing from the spirit and scope of the invention as hereinafter defined by the appended claims.

What is claimed is:

1. In a device for preventing surge of a compressor, a passage connected to the discharge side of said compressor for bleeding air from the compressor for useful purposes, a boost venturi located at the entrance of said passage, two separate pressure lines for sensing the total pressure at the entrance of the venturi and the static pressure at the throat of the venturi and means responsive to the ratio of said two pressures for maintaining sufficient flow of bleed air through said passage to prevent surge of the compressor when the bleed air flow requirement for useful purposes is not sufficient to prevent surge, said total pressure line containing a fixed upstream orifice and an adjustable downstream orifice connected to atmosphere so that both said orifices are choked, and a pressure passage connected intermediate said orifices to provide a pressure for said means which is a constant fraction of said total pressure so that said means can balance said fraction pressure against said static pressure.

2. A device as defined in claim 1, having means for adjusting the area of said adjustable orifice in order to determine the value of said constant fraction.

3. In a device for preventing surge of a compressor, a duct connected to the discharge side of the compressor for bleeding air therefrom and having a dividing portion forming two separate passages, means for sensing airflow in one of said passages as corrected to the discharge station of the compressor and a first valve positioned in the other of said passages, an overboard passage connected to said one passage and having a second valve, and means responsive to said airflow sensing means for opening either said first or second valve to maintain a constant corrected flow through said one passage sufficient to prevent surge of said compressor.

4. A device as defined in claim 3 having a third valve positioned in said duct downstream from said two passages for selecting the amount of useful air bleed from said compressor.

5. A device as defined in claim 3 wherein said airflow sensing means comprises a boost venturi for said one passage and two separate pressure lines for sensing the total pressure at the entrance of the venturi and the static pressure at the throat of the venturi.

6. In a device for preventing surge of a compressor, a duct connected to the discharge side of the compressor for bleeding air therefrom for useful purposes and having a dividing portion forming two separate passages, a boost venturi for one of said passages, two separate pressure lines for sensing the total pressure at the entrance of the venturi and static pressure at the throat of the venturi, a first valve positioned in the other of said passages, an overboard passage connected to said one passage and having a second valve, and pressure differential means responsive to the ratio of said pressures for opening either said first or second valve to maintain a constant minimum flow through said one passage sufficient to prevent surge of said compressor.

7. A device as defined in claim 6 wherein said total pressure line contains a fixed upstream orifice and an adjustable downstream orifice connected to atmosphere so that both said orifices are choked, and a pressure passage connected intermediate said orifices to provide a pressure for said differential means which is a constant fraction of said total pressure so that said differential means can balance said fraction pressure against said static pressure.

8. A device as defined in claim 6 having a third valve positioned in said duct downstream from said two passages for selecting the amount of useful air bleed from said compressor.

9. In a device for preventing surge of a compressor, duct means connected to the discharge side of the compressor for bleeding air therefrom for useful purposes, said duct means comprising two separate passages over at least a portion of its length, means located in said duct to select the desired bleed air flow for useful purposes, means for sensing air flow corrected to the compressor discharge station in one of said passages, a first valve positioned in the other of said passages, an overboard passage connected to said one passage and containing a second valve, and linkage means responsive to said airflow sensing means for opening said first valve when the selected air flow is greater than required to prevent surge and for opening said second valve when the selected airflow is less than required to prevent surge, said first and second valves operating to maintain a constant corrected flow through said one passage which is sufficient to prevent compressor surge at all values of compressor pressure ratio.

10. In a device as defined in claim 9 wherein said air flow sensing means comprises a boost venturi for said one passage, pressure lines associated with said boost venturi for sensing the total pressure at the entrance of the venturi and the static pressure at the throat of the venturi, and diaphragm means movable in response to the ratio of the pressures sensed in said pressure lines.

11. In a device as defined in claim 10 wherein said linkage means comprises first and second independent connections between said first and second valves, respectively, and said diaphragm means, said valves being closed when the selected airflow equals the value of the constant airflow through said one passage sufficient to prevent surge, said first connection being moved by said diaphragm means to open said first valve only when the selected airflow is increased above said constant value and said second connection being moved by said diaphragm means to open said second valve only when the selected airflow is less than said constant value.

12. In a device as defined in claim 10 wherein one of said pressure lines connects a fixed fraction of said total pressure to one side of said diaphragm means and the other line connects the other side of said diaphragm means to said static pressure, said fixed fraction being obtained from pressure divider means located in said one line.

References Cited in the file of this patent

UNITED STATES PATENTS

| | | |
|---|---|---|
| 1,333,986 | Lundgaard | Mar. 16, 1920 |
| 1,363,513 | Keith | Dec. 28, 1920 |
| 1,659,354 | Earl | Feb. 14, 1928 |
| 1,744,872 | Earl | Jan. 28, 1930 |
| 2,404,324 | Staley | July 16, 1946 |
| 2,409,533 | Borden | Oct. 15, 1946 |
| 2,424,137 | Ball | July 15, 1947 |
| 2,645,240 | Drake | July 14, 1953 |
| 2,781,634 | Moore | Feb. 19, 1957 |